US005526225A

United States Patent [19]

Wang

[11] Patent Number: 5,526,225

[45] Date of Patent: Jun. 11, 1996

[54] RECEPTACLE WITH LAMP SWITCH AND BREAKER MEANS

[76] Inventor: Ming-Shan Wang, No. 1-2, Lane 975, Chun-Jih Road, Tao-Yuan City, Taiwan, R.O.C.

[21] Appl. No.: 496,409

[22] Filed: Jun. 29, 1995

[51] Int. Cl.[6] .................... H02B 1/26

[52] U.S. Cl. .................... 361/643; 307/150; 337/16; 337/37; 337/68; 361/730; 361/775; 439/130; 439/248; 439/501; 439/502

[58] Field of Search .................... D13/137, 140, D13/147, 160–161; 307/38, 115–116, 141, 147, 150; 337/16, 37, 68; 361/118, 641, 643, 730, 775; 439/105, 130, 248, 501–502, 620, 695, 752

[56] References Cited

U.S. PATENT DOCUMENTS

| | | | |
|---|---|---|---|
| 4,930,047 | 5/1990 | Peterson | 361/641 |
| 5,071,367 | 10/1991 | Luu | 439/501 |
| 5,131,857 | 7/1992 | Gmelin et al. | 439/130 |
| 5,157,273 | 10/1992 | Medendorp et al. | 307/147 |

*Primary Examiner*—Gregory D. Thompson

*Attorney, Agent, or Firm*—Morton J. Rosenberg; David I. Klein

[57] ABSTRACT

A receptacle including a casing to hold a positive contact metal plate, a negative contact metal plate, which is connected to the negative terminal of power supply, and a ground plate, a T-shaped copper plate mounted inside the casing and connected to the positive terminal of power supply, a bimetal strip connected to the positive contact metal plate and disposed in contact with the T-shaped copper plate, an insulative member turned about a post inside the casing and supported on a spring, and a press button mounted on the outside of the casing, wherein when the press button is depressed, the bimetal strip is forced away from the T-shaped copper plate by the insulative member to cut off power supply; when the receptacle is electrically overloaded, the bimetal strip is heated to deform and to disconnect from the T-shaped copper plate to cut off power supply.

3 Claims, 9 Drawing Sheets

RECEPTACLE WITH LAMP SWITCH AND BREAKER MEANS

BACKGROUND OF THE INVENTION

The present invention relates to electric receptacles, and relates more particularly to an improved structure of receptacle which comprises a lamp switch for operational indication, and a bimetal strip type overload breaker for overload protection.

Various electric receptacles are known having a lamp switch for operational indication. A see-saw switch is commonly used for this purpose. If the lamp switch is not switched on, power supply is cut off from the electric receptacle. Therefore, when the electric receptacle is in use, the lamp switch must be switched on. Furthermore, if an electric receptacle is electrically overloaded, it will be burnt out. Because the lamp switch does not automatically trip off when the receptacle is electrically overloaded, this structure of electric receptacle is not safe in use.

SUMMARY OF THE INVENTION

The present invention has been accomplished under the circumstances in view. It is one object of the present invention to provide a receptacle which uses a bimetal strip to automatically cut off power supply when the receptacle is electrically overloaded. It is another object of the present invention to provide a receptacle which automatically turns on a neon lamp for operational indication when it is connected to electric power supply.

According to the preferred embodiment of the present invention, the receptacle comprises a casing formed of a bottom shell and a top cover shell to hold a positive contact metal plate, a negative contact metal plate, which is connected to the negative terminal of power supply, and a ground plate, a T-shaped copper plate mounted inside the casing and connected to the positive terminal of power supply, a bimetal strip connected to the positive contact metal plate and disposed in contact with the T-shaped copper plate, an insulative member turned about a post inside the casing and supported on a spring, and a press button mounted on the outside of the casing, wherein when the press button is depressed, the bimetal strip is forced away from the T-shaped copper plate by the insulative member to cut off power supply; when the receptacle is electrically overloaded, the bimetal strip is heated to deform and to disconnect from the T-shaped copper plate to cut off power supply.

BRIEF DESCRIPTION OF THE DRAWINGS

FIG. 10-(B) is similar to FIG. 10-(A) but showing the bimetal strip returned to its former shape and disposed in contact with the T-shaped copper plate according to the present invention;

FIG. 10-(C) is similar to FIG. 10-(B) but showing the press bottom depressed, and the platinum contact of the bimetal strip moved away from the platinum contact of the T-shaped copper plate according to the present invention;

DETAILED DESCRIPTION OF THE PREFERRED EMBODIMENT

Figure 1:
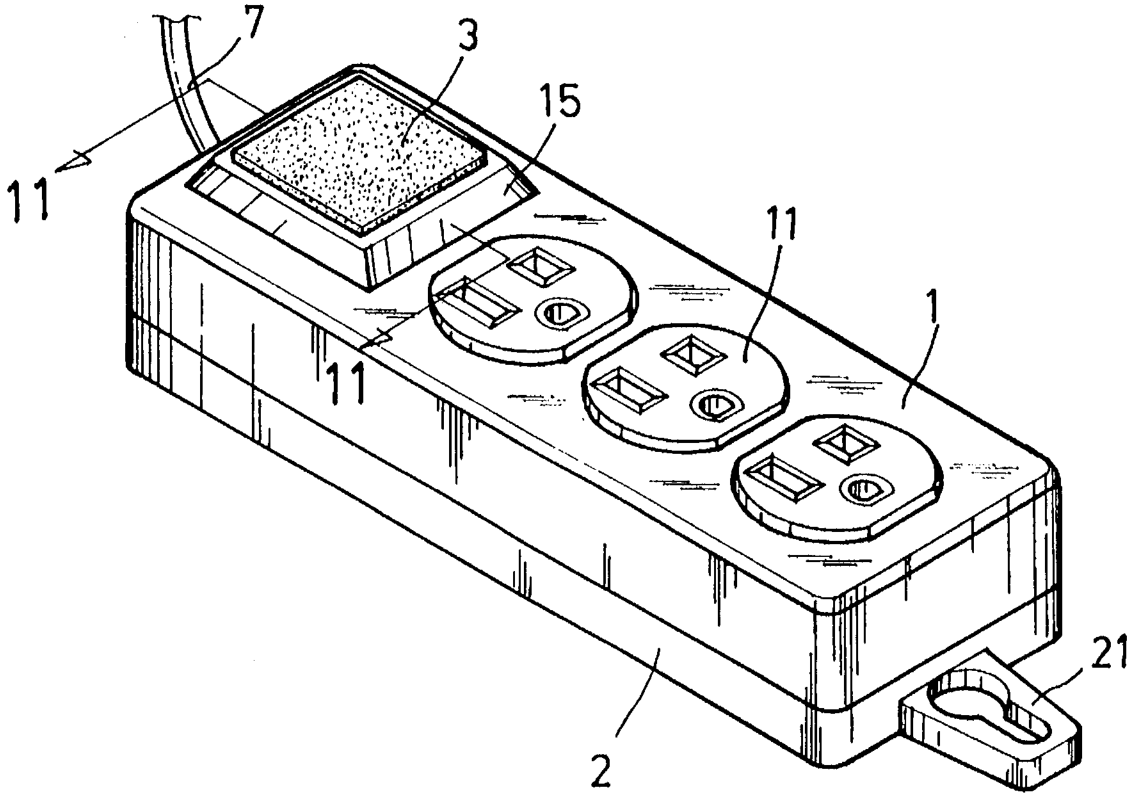
FIG. 1 is an elevational view of a receptacle according to the present invention.
Figure 2:
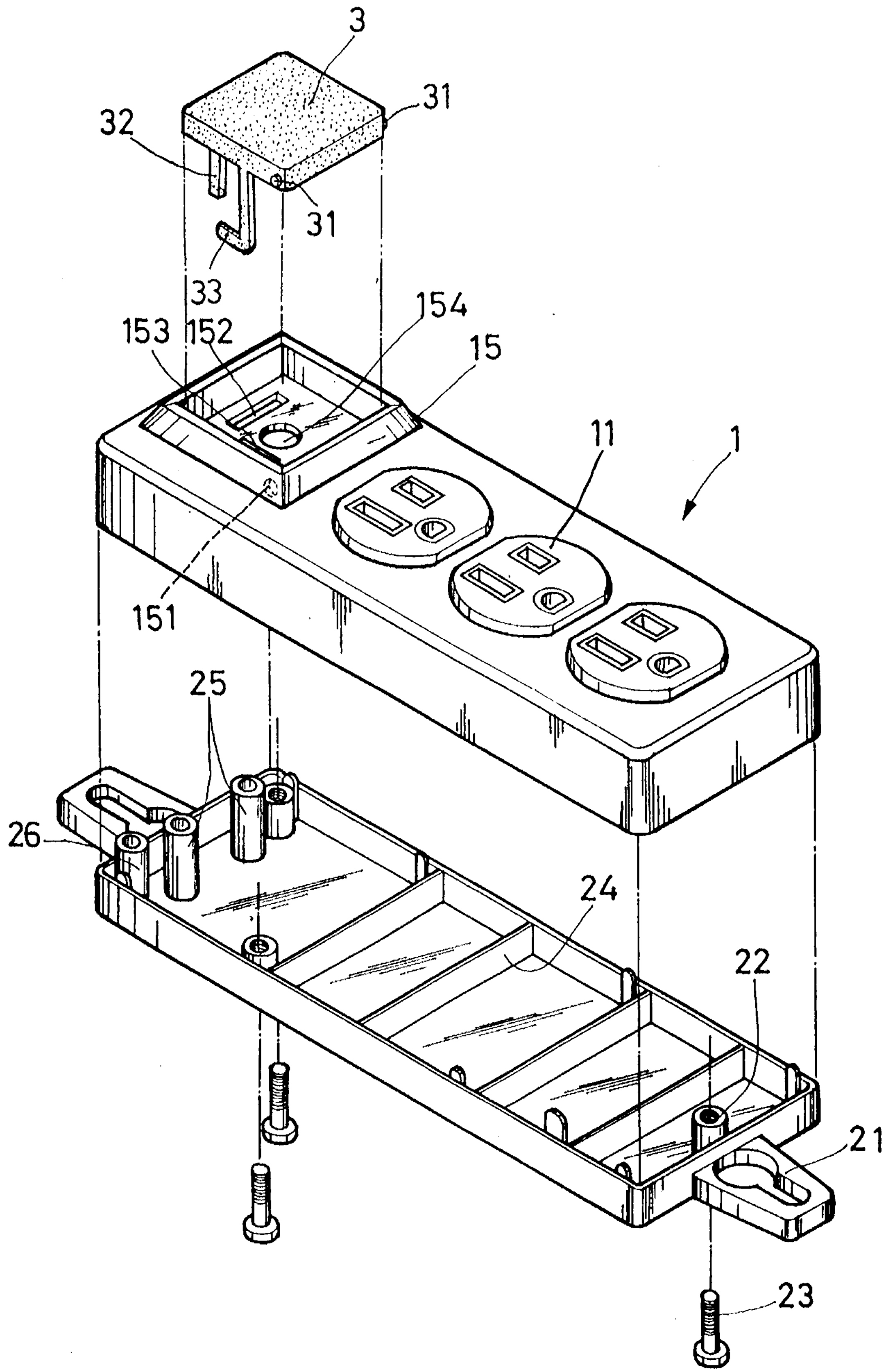
FIG. 2 is a dismantled view of the bottom shell, the top cover shell, and the press button for the receptacle shown in FIG. 1.
Figure 3:
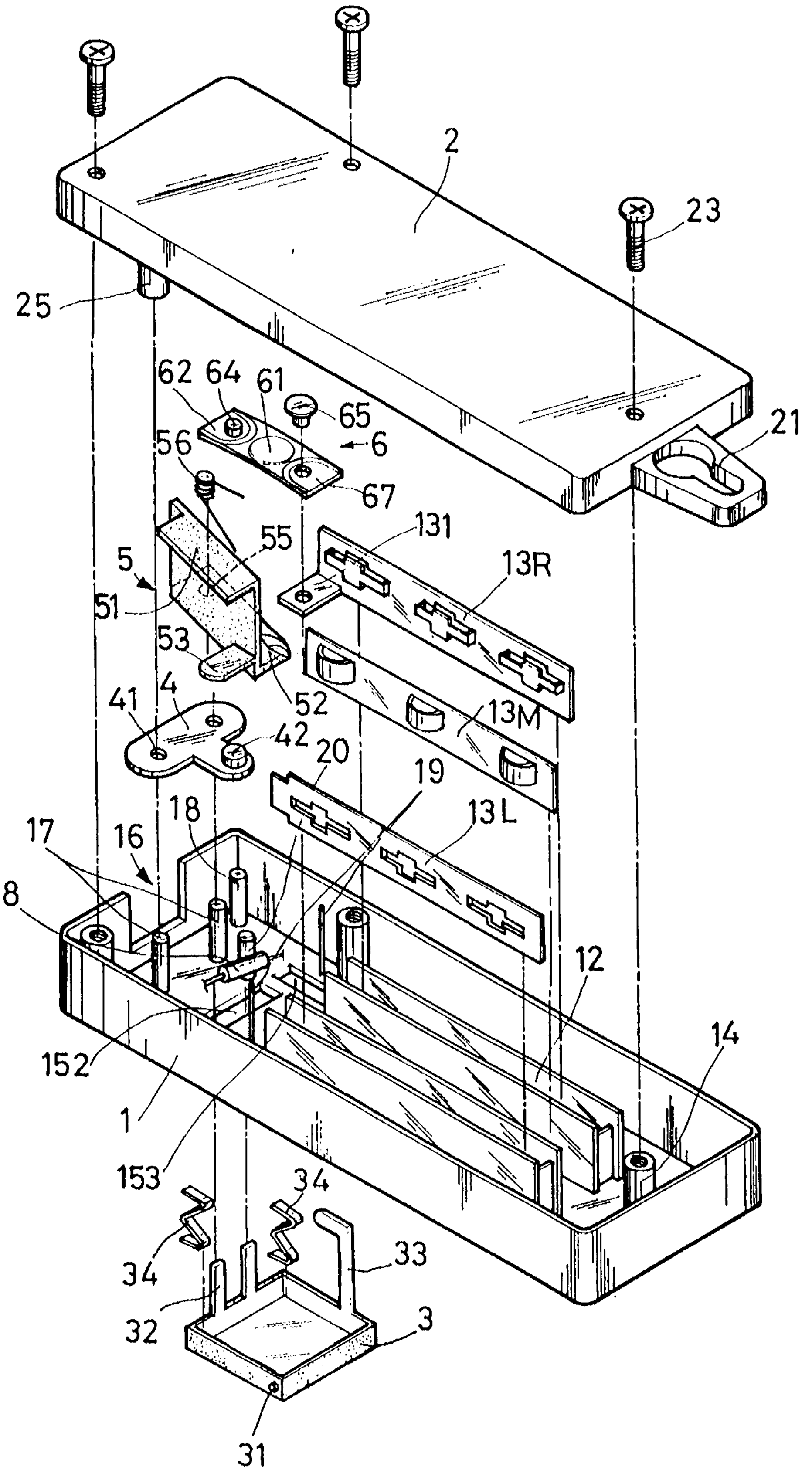
FIG. 3 is an exploded view of the receptacle shown in FIG. 1.

Referring to FIGS. 1, 2, 3, and 4, a receptacle in accordance with the present invention is generally comprised of a bottom shell 2, and a top cover shell 1 covered on the bottom shell 2. The top cover shell 1 comprises at least one plug hole set 11, a plurality of troughs 12 on the inside for mounting two contact metal plates, namely, the negative contact metal plate 13L and the positive contact metal plate 13R, a ground plate 13M, and a plurality of female screw rods 14. The bottom shell 2 comprises a hanger 21 at one end for hanging, a plurality of female screw rods 22 respectively connected to the female screw rods 14 on the top cover shell 1 by screws 23, and a plurality of upright locating boards 24 on the inside for holding down the contact metal plates 13L and 13R and the ground plate 13M within the troughs 12.

The main features of the present invention is outlined hereinafter with reference to FIGS. from 1 to 4 again. The top cover shell 1 comprises an endless flange 15 raised from the outside wall adjacent to the at least one plug hole set 11, a plurality of recessed portions 151 on the inside of the periphery of the endless flange 15, a plurality of slots, namely, the front slot 152, the lateral slot 153 and the center slot 154 within the endless flange 15, a wire hole 16 at one end, a pair of upright posts 17 on the inside adjacent to the wire hole 16, a locating post 18 on the inside adjacent to the upright posts 17, a pair of locating rods 19 on the inside adjacent to the troughs 12 at one end for mounting a neon lamp circuit, an upright stop rod 20 on the inside adjacent to the lateral slot 153. The bottom shell 2 comprises a plurality of upright locating tubes 25 and 26 corresponding to the upright posts 17 and the locating post 18. A press button 3 is supported within the endless flange 15 by spring members 34, having a plurality of raised portions 31 fitted into the recessed portions 151 on the endless flange 15, two push rods 32 vertically disposed at the bottom at the front side and respectively inserted through the front slot 152, and a L-shaped stop rod 33 vertically disposed at the bottom at one lateral side and inserted through the lateral slot 153. A substantially T-shaped copper plate 4 is provided having two pin holes 41 respectively fastened to the upright posts 17 of the top cover shell 1, and a platinum contact 42 at the front end thereof. A substantially Z-shaped insulative member 5 is fastened to the locating post 18, comprising a horizontal upper guide wall 51 and a horizontal lower guide wall 52 at two opposite sides at different elevations, a stop strip 53 suspended below the horizontal upper guide wall 51, a tilted crescent block 54 adjacent to the horizontal lower guide wall 52, and a locating hole 55 through the horizontal lower guide wall 52, which receives the locating post 18. After the insulative member 5 is fastened to the locating post 18, a torsional spring 56 is mounted around the locating post 18 and stopped above the horizontal lower guide wall 52. A bimetal strip 6 is provided having a circular actuating portion 61 curved upwards in the middle, a front half-round recess 62 at one end, a platinum contact 64 fixed to the front half-round recess 62 and disposed above the platinum contact 42 on the T-shaped copper plate 4, a rear half-round recess 67 at an opposite end and fixed to a rear lug 131 on one contact metal plate 13R by a rivet 65.

Figure 4:
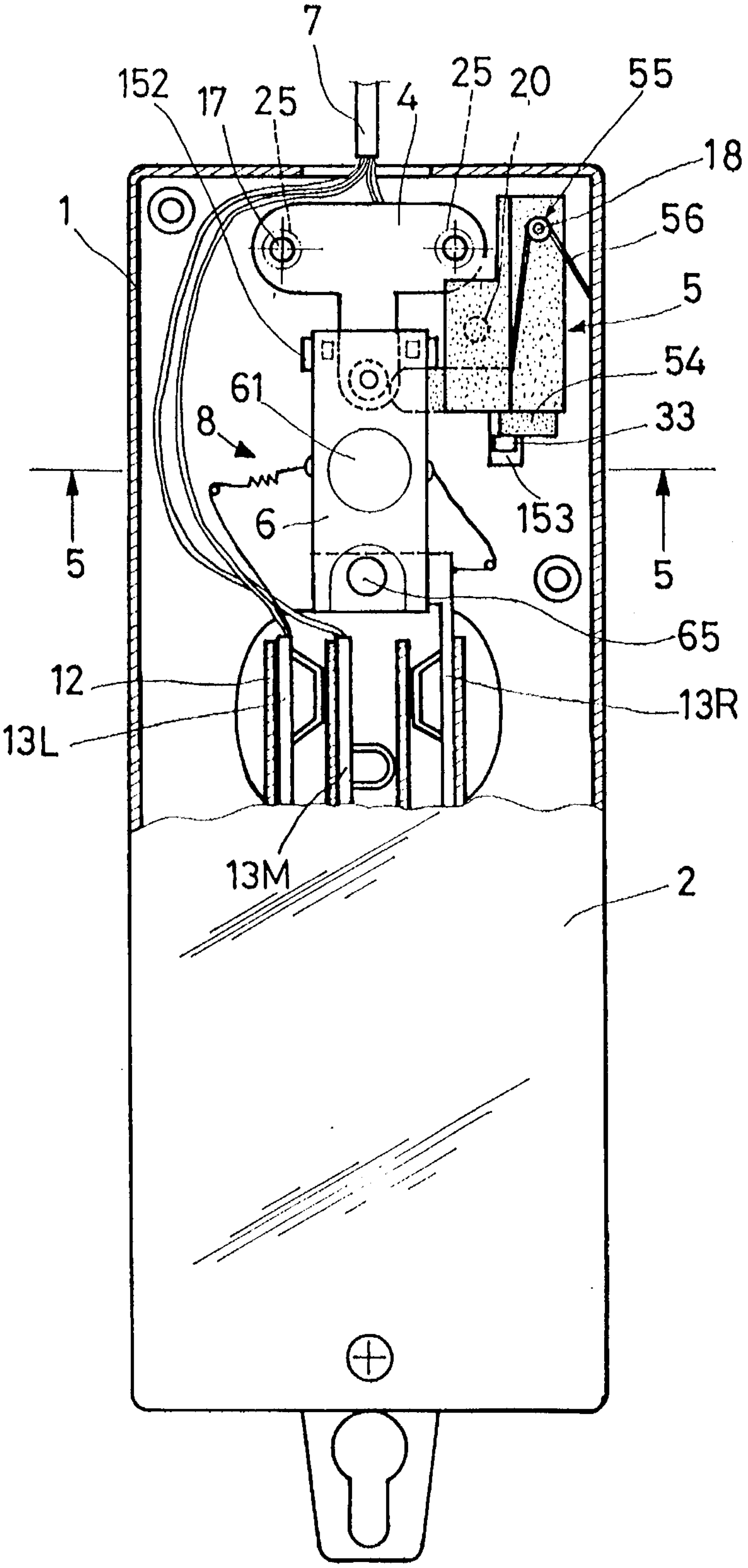
FIG. 4 is a plain view of the receptacle shown in FIG. 1, showing the arrangement of the internal parts.
Figure 5:
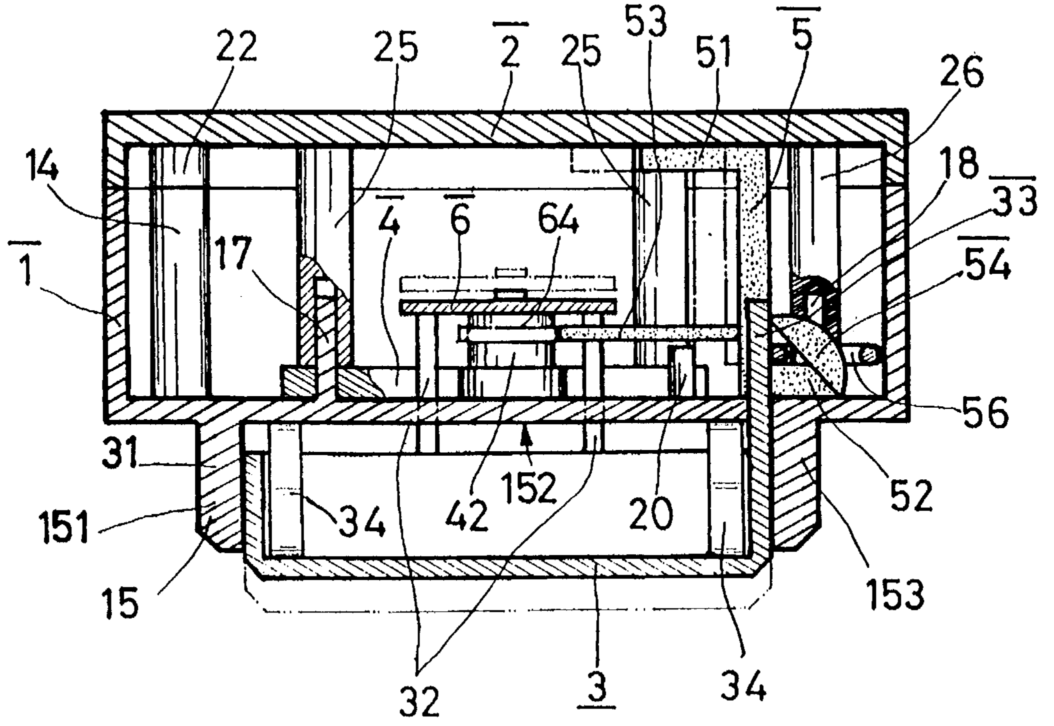
FIG. 5 is a cross section of the receptacle shown in FIG. 1.

Referring to FIGS. 4 and 5, after the T-shaped copper plate 4 and the insulative member 5 are respectively fastened to the upright posts 17 and the locating post 18, the torsional spring 56 is mounted around the locating post 18, then the upright posts 17 and the locating post 18 are respectively fitted into the upright locating tubes 25 and 26, and therefore the T-shaped copper plate 4 and the insulative member 5 are retained within the bottom shell 2 and the top cover shell 1 and, the two opposite ends of the torsional spring 56 are respectively stopped against the horizontal lower guide wall 52 and the inside wall of the bottoms hell 2. When assembled, the stop strip 53 of the insulative member 5 is disposed adjacent to the platinum contacts 42 and 64. When the bimetal strip 6 trips off, the platinum contact 64 on the bimetal strip 6 is disconnected from the platinum contact 42 on the copper plate 4, and at the same time the stop strip 53 is forced by the torsional spring 56 to insert into the gap between the platinum contacts 64 and 42 and the insulative member 5. When the stop strip 53 is inserted into the gap between the platinum contacts 64 and 42, the insulative member 5 is stopped in place by the upright stop rod 20.

Figure 6:
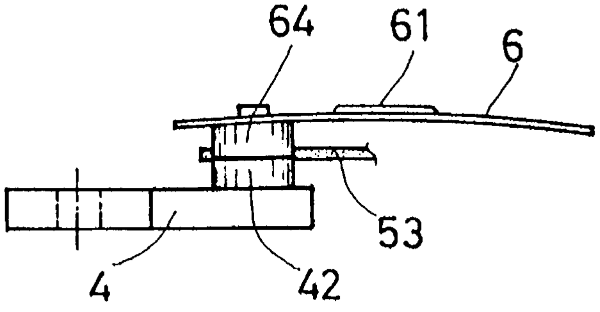
FIG. 6 is a schematic drawing showing the bimetal strip and the T-shaped copper plate electrically connected together according to the present invention.
Figure 7:
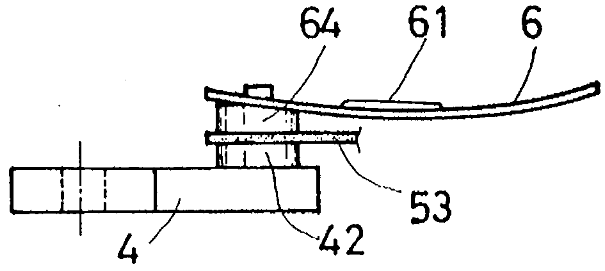
FIG. 7 is similar to FIG. 6 but showing the bimetal strip deformed and electrically disconnected from the T-shaped copper plate.

Referring to FIGS. 6 and 7, the bimetal strip 6 is made from two metals of different impedance bonded together by forging, and worked by means of the application of V=IR and W=VA. When the temperature of the bimetal strip 6 is changed, the circular actuating portion 61 is turned from the convex shape into the concave shape (see FIG. 7). On the contrary, when the temperature of the bimetal strip 6 drops, the circular actuating portion 61 returns from the concave shape to the former convex shape. The process of the shape change of the bimetal strip 6 takes about 20 to 30 seconds when the bimetal strip 6 is electrically overloaded.

Figure 8:
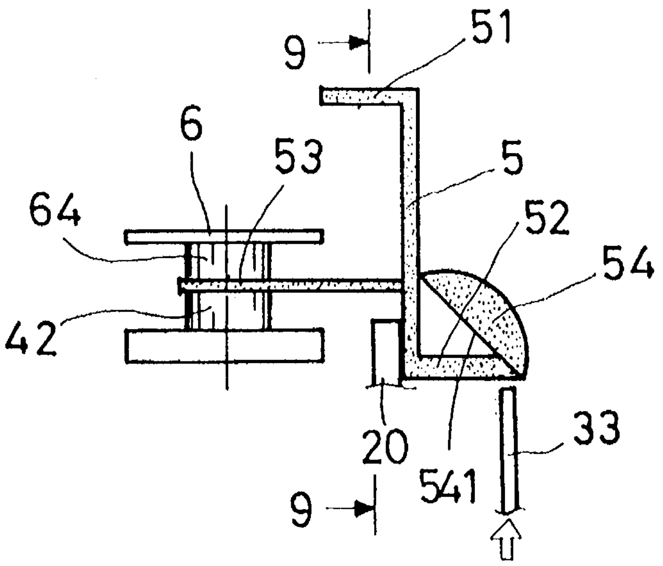
FIG. 8 is a schematic drawing showing the structure of the insulative member and its position relative to the L-shaped stop rod of the press button.
Figure 9:
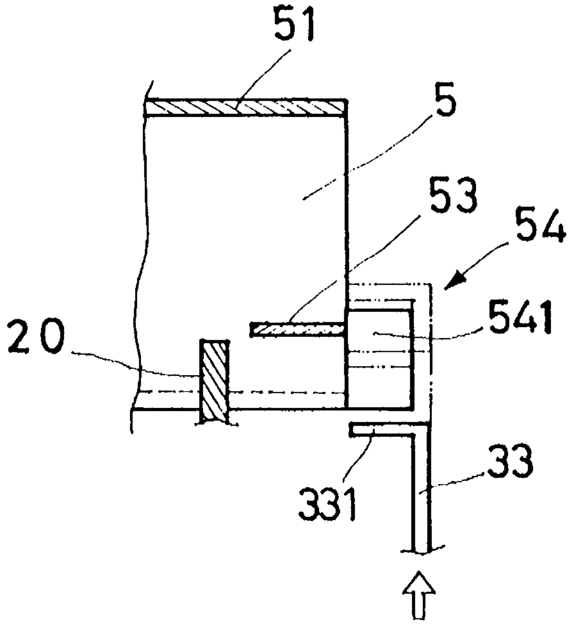
FIG. 9 is a sectional view taken along line 9—9 of FIG. 8.

Referring to FIGS. 8 and 9, and FIG. 5 again, the insulative member 5 is preferably molded from bakelite. When installed, the bottom end of the L-shaped stop rod 33 is suspended below the crescent block 54 of the insulative member 5. When the press button 3 is depressed, the L-shaped stop rod 33 is forced to push the insulative member 5 outwards, as shown in FIG. 5, and therefore the platinum contacts 42 and 64 are electrically connected to turn on the electric circuit. When the L-shaped stop rod 33 is not moved, the insulative member 5 is forced leftwards by the torsional spring 56 and stopped at the stop rod 20, causing the stop strip 53 inserted in between the platinum contacts 42 and 64, and therefore the electric circuit is off. As illustrated in FIGS. 8 and 9, the L-shaped stop rod 33 of the press button 3 has a bottom end 331 stopped at the bottom side 541 of the tilted crescent block 54. When the bottom end 331 passes through the bottom side 541 of the tilted crescent block 54, it can be moved back to its former position over the smoothly curved top side of the tilted crescent block 54.

Figure 10:
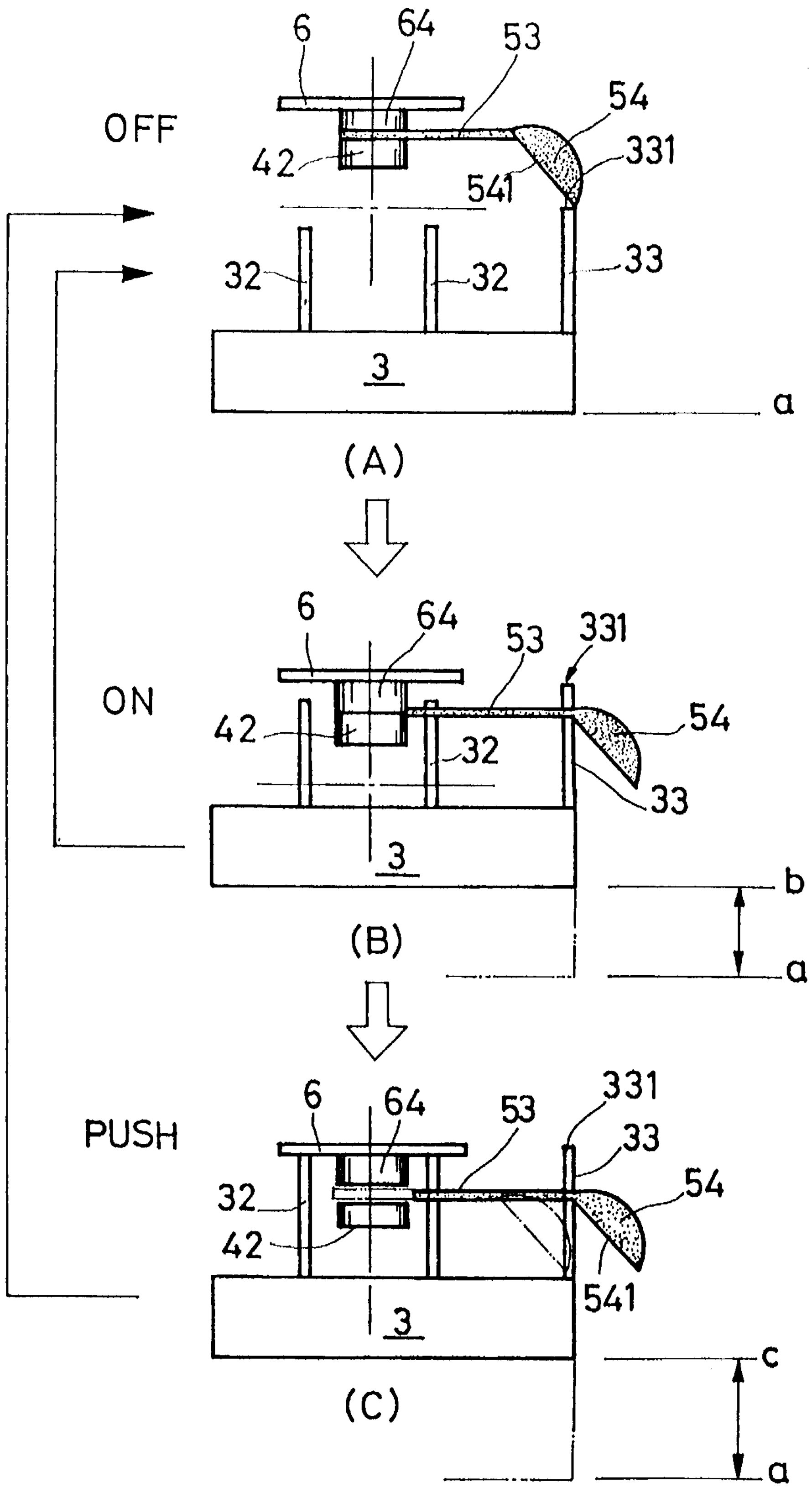
FIG. 10-(A) is a schematic drawing showing the press button released and the bimetal strip disconnected from the T-shaped copper plate when overloaded.

Referring to FIG. 10 and FIG. 5 again, when the bimetal strip 6 trips off, a gap is formed between the platinum contacts 64 and 42 into which the stop strip 53 is inserted to turn off the electric-circuit. When the temperature of the bimetal strip 6 drops and the bimetal strip 6 returns to its former shape, the electric circuit is still at the off state because the platinum contacts 64 and 42 are still separated from each other by the stop strip 53 (see FIG. 10-(A). At this stage, the press button 3 is at the released state and not depressed, the bottom end 331 of the L-shaped stop rod 33 is stopped at the bottom edge of the tilted crescent block 54.

Referring to FIG. 10-(B), when the press button 3 is depressed, the L-shaped stop rod 33 is forced to move the tilted crescent block 54 rightwards. When the bottom end 331 of the L-shaped stop rod 33 passes over the bottom side 541 of the tilted crescent block 54, the stop strip 53 is forced away from the gap between the platinum contacts 64 and 42, and the bimetal strip 6 returns to its former shape by means of its material resilient power, and therefore the platinum contact 64 of the bimetal strip 6 is forced into contact with the platinum contact 42 of the copper plate 4 again, causing the electric circuit turned on. At this moment, the press button 3 is moved from position "a" to position "b". If the press button 3 is released, it immediately moves from position "b" back to position "a" while the electric circuit is still maintained at "ON" state. However, when the bimetal strip 6 is electrically overloaded, it immediately trips off, and the platinum contacts 42 and 64 are separated by the stop strip 53 again as shown in FIG. 10-(A), causing the electric circuit turned off.

Referring to FIGS. 10-(C), when to change the "ON" state as shown in FIG. 10-(B) to the "OFF" state, it can be conveniently done by moving the press button 3 from position "a" to position "b" and then to position "c". When the press button 3 is moved to position "c", the push rods 32 are forced to push the bimetal strip 6 away from the platinum contact 42 of the copper plate 4, at the same time the bottom end 331 of the L-shaped stop rod 33 passes over the tilted crescent block 54, causing the stop strip 53 moved leftwards and inserted into the gap between the platinum contact 64 of the bimetal strip 6 and the platinum contact 42 of the copper plate 4, and therefore the electric circuit is turned off. When the press button 3 is released, the L-shaped stop rod 33 moved over the smoothly curved top side of the tilted crescent block 54 to its former position.

Referring to FIG. 4, when the electric wire 7 is connected to the receptacle, the positive line is connected to the copper plate 4, the negative line is connected to the negative contact metal plate 13L, and the neutral line is connected to the ground plate 13M. Therefore, when the platinum contacts 42 and 64 are disposed in contact with each other, the electric circuit is turned on; on the contrary, when the platinum contacts 42 and 64 are disconnected from each other, the electric circuit is turned off. Furthermore, a neon lamp circuit 8 (which is stopped from sight in FIG. 4 by the bimetal strip 4) is connected between the contact metal plates 13L and 13R. When the press button 3 is working, the neon lamp bulb (not shown) of the neon lamp circuit 8 is turned on to emit light through the center slot 154 (see FIG. 2).

Figure 11:
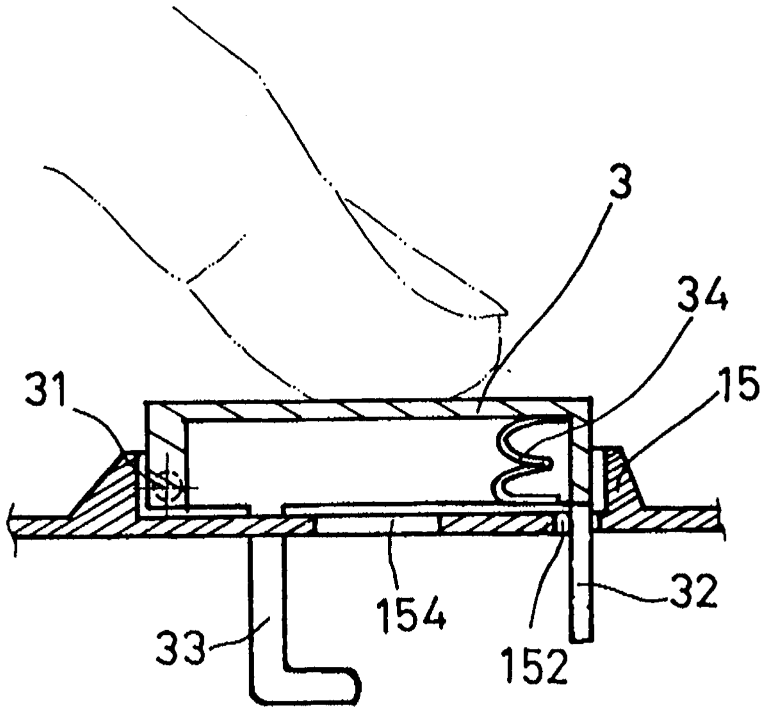
FIG. 11 is a sectional view taken along line 11—11 of FIG. 1.
Figure 13:
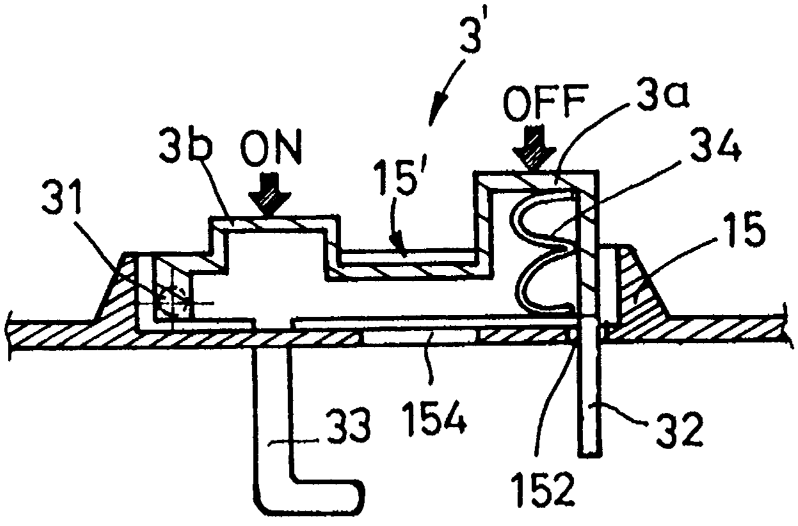
FIG. 13 is a sectional view taken along line 13—13 of FIG. 12.
Figure 12:
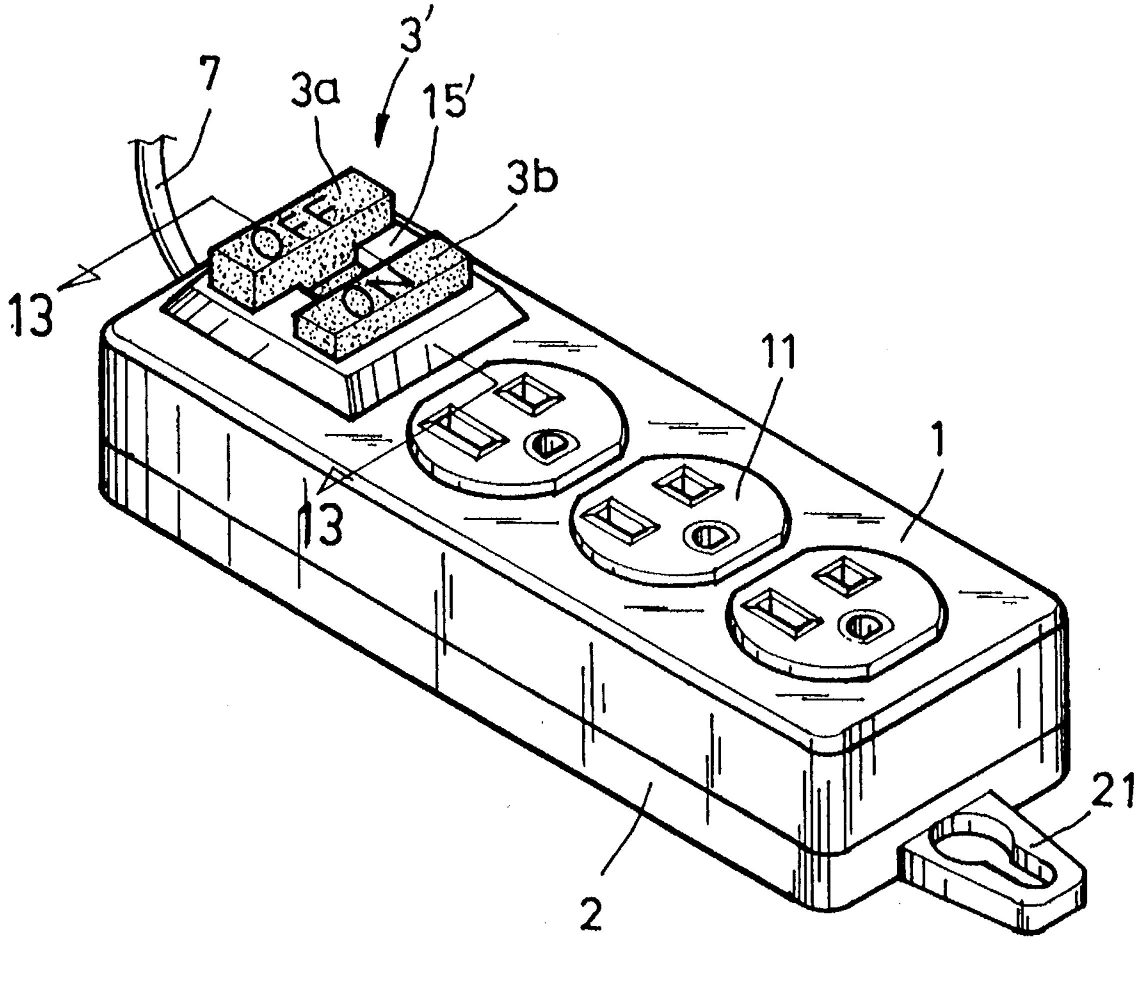
FIG. 12 shows an alternate form of the present invention.

FIG. 12 shows an alternate form of the present invention in which the press button 3' is shaped like the English character "H", having a front transverse cap section 3*a* for OFF control and a rear transvese cap section 3*b* for ON control. The front transverse cap section 3*a* is disposed at a higher elevation that the rear transverse cap section 3*b*. As illustrated in FIG. 13, the L-shaped stop rod 33 and the push rod 32 remain unchanged. The press button 3 shown in FIG. 11 is operated to control the circuit in the order of OFF->ON->OFF. The press button 3' shown in FIGS. 12 and 13 can be accurately operted to turn on the circuit simply by pressing the rear transverse cap section 3*b*. When the rear transverse cap section 3*b* is depressed and limited by a cross strip 15' on the endless flange 15, the circuit is ON. The fuction of the front transverse cap section 3*a* is same as the press button 3 shown in FIG. 11, i.e., the front transverse cap section 3*a* is operated to control the circuit in the order of OFF->ON->OFF.

It is to be understood that the drawings are designed for purposes of illustration only, and are not intended as a definition of the limits and scope of the invention disclosed.

I claim:

1. A receptacle of the type comprising a bottom shell and a top cover shell fixed to said bottom shell to hold a positive contact metal plate, a negative contact plate and a ground plate on the inside, said top cover shell having at least one plug hole set for the connection of an electric plug respectively, wherein:

said top cover shell comprises an endless flange raised from an outside wall thereof adjacent to said at least one plug hole set, a plurality of recessed portions on the periphery of said endless flange on the inside, a front slot and a lateral slot and a center slot within said endless flange, a pair of upright posts on the inside near one end, a locating post on the inside adjacent to said upright posts, a pair of locating rods on the inside adjacent said positive and negative contact metal plates, an upright stop rod on the inside adjacent to said lateral slot;

said bottom shell comprises a plurality of upright locating tubes respectively fastened to said upright posts and said locating post;

a neon lamp circuit mounted on said locating rods and electrically connected between said positive contact metal plate and said negative contact metal plate and having a neon lamp bulb disposed in said center slot on said top cover shell;

a press button mounted within said endless flange on said top cover shell and supported on spring members, said press button comprising a plurality of raised portions engaged with the recessed portions on said endless flange, two push rods respectively inserted into said front slot on said top cover shell, and a L-shaped stop rod inserted through said lateral slot on said top cover shell;

a substantially T-shaped copper plate fastened to said upright posts of said top cover shell, said T-shaped copper plate having a platinum contact at a front end thereof;

a substantially Z-shaped insulative member turned about said locating post of said top cover shell, said insulative member comprising a horizontal upper guide wall and a horizontal lower guide wall at two opposite sides at different elevations, a stop strip suspended below said horizontal upper guide wall, a tilted crescent block adjacent to said horizontal lower guide wall, and a locating hole through said horizontal lower guide wall, which receives said locating post of said top cover shell;

a torsional spring is mounted around said locating post, having one end stopped above said horizontal lower guide wall of said insulative member and an opposite end stopped against said bottom shell;

a bimetal strip having a circuit actuating portion curved upwards in the middle, a front half-round recess at one end securely fixed with a platinum contact disposed in contact with the platinum contact on said T-shaped copper plate, and a rear half-round recess at an opposite end riveted to a rear lug on said positive contact metal plate, said bimetal strip being deformed to move the platinum contact of said bimetal strip away from the platinum contact of said T-shaped copper plate when the receptacle is electrically overloaded, said platinum contact of said bimetal strip being moved away from the platinum contact of said T-shaped copper plate by the push rods of said press button when said press button is depressed.

2. The receptacle of claim 1 wherein said at least one plug hole set of said top cover shell includes one plug hole set for the connection of an electric plug.

3. The receptacle of claim 1 wherein said at least one plug hole set of said top cover shell includes a plurality of plug hole sets for the connection of a plurality of electric plugs respectively.

* * * * *